United States Patent
Inui et al.

(10) Patent No.: US 7,166,322 B2
(45) Date of Patent: Jan. 23, 2007

(54) OPTICAL WAVEGUIDE AND METHOD FOR PRODUCING THE SAME

(75) Inventors: Yukitoshi Inui, Aichi (JP); Manabu Kagami, Nagoya (JP); Akari Kawasaki, Aichi (JP); Tatsuya Yamashita, Nisshin (JP); Masatoshi Yonemura, Aichi (JP)

(73) Assignee: Toyoda Gosei Co., Ltd., Aichi (JP)

( * ) Notice: Subject to any disclaimer, the term of this patent is extended or adjusted under 35 U.S.C. 154(b) by 0 days.

(21) Appl. No.: 10/913,505

(22) Filed: Aug. 9, 2004

(65) Prior Publication Data
US 2005/0058420 A1 Mar. 17, 2005

(30) Foreign Application Priority Data
Aug. 8, 2003 (JP) ............................ P2003-290914
Aug. 8, 2003 (JP) ............................ P2003-290915

(51) Int. Cl.
*B05D 5/06* (2006.01)
(52) U.S. Cl. ................... 427/163.2; 427/487; 427/492; 427/493; 427/508; 427/512; 427/513; 427/581; 427/333; 427/412.1
(58) Field of Classification Search ............... 427/487, 427/492, 493, 508, 512, 513, 581, 163.2, 427/333, 412.1
See application file for complete search history.

(56) References Cited

U.S. PATENT DOCUMENTS 3,920,313 A * 11/1975 Wong et al. ................ 385/141
5,057,561 A * 10/1991 Manica et al. ................ 524/68
5,642,454 A * 6/1997 Kopylov et al. ............ 385/123
2001/0048968 A1 * 12/2001 Cox et al. .................... 427/162
2002/0114601 A1 8/2002 Kagami et al.
2002/0186935 A1 12/2002 Inui et al.
2003/0031414 A1 2/2003 Inui et al.
2003/0125408 A1 7/2003 Inui et al.
2004/0131320 A1 7/2004 Inui et al.

FOREIGN PATENT DOCUMENTS

GB 2 143 650 A 2/1985

(Continued)

OTHER PUBLICATIONS

Brian H. Cumpston, et al., "Two-photon polymerization initiators for three-dimensional optical date storage and microfabrication", Nature, vol. 398. pp. 51-54. Mar. 4, 1999.

*Primary Examiner*—Alain L. Bashore
(74) *Attorney, Agent, or Firm*—McGinn IP Law Group, PLLC

(57) ABSTRACT

In the condition that an acrylic transparent vessel is filled with a curable resin solution capable of being cured by a light, a plastic optical fiber is immersed in the curable resin solution. A laser beam is applied on the curable resin solution through the plastic optical fiber. The curable resin solution is cured gradually by the laser beam applied on the curable resin solution, so that an axial core is formed. Then, the transparent vessel is left at rest for predetermined time, or uncured part of the curable resin solution is removed from the transparent vessel and the transparent vessel is then filled with another curable resin solution. Then, ultraviolet rays are applied on the transparent vessel from the outside of the transparent vessel to cure the residual uncured part of the curable resin solution.

14 Claims, 8 Drawing Sheets

FOREIGN PATENT DOCUMENTS

| | | |
|---|---|---|
| JP | 59-223408 | 12/1984 |
| JP | 8-320422 | 12/1996 |
| JP | 11-326660 | 11/1999 |
| JP | 2000-147291 | 5/2000 |
| JP | 2000-347043 | 12/2000 |
| JP | 2002-31733 | 1/2002 |
| JP | 2002-169038 | 6/2002 |
| JP | 2002-258095 | 9/2002 |
| WO | WO 96/42036 | 12/1996 |

\* cited by examiner

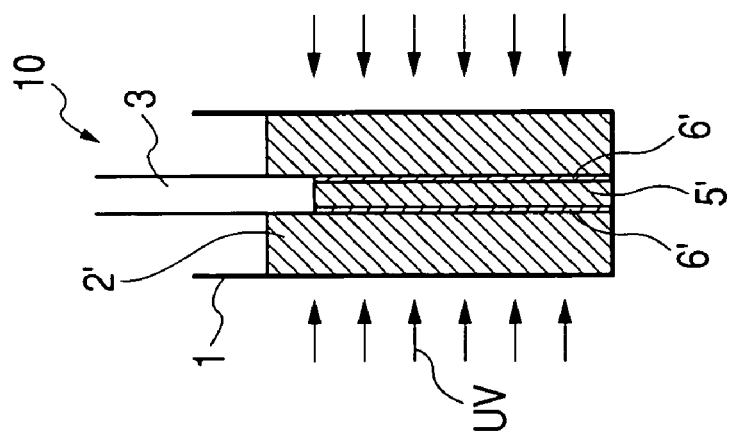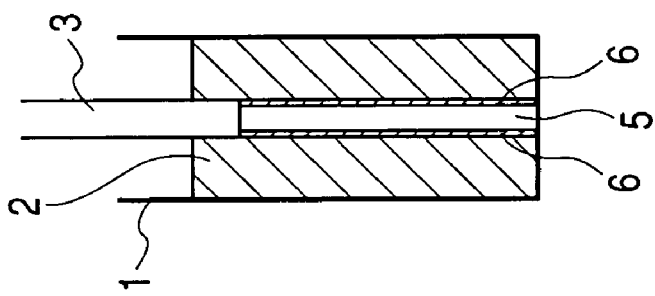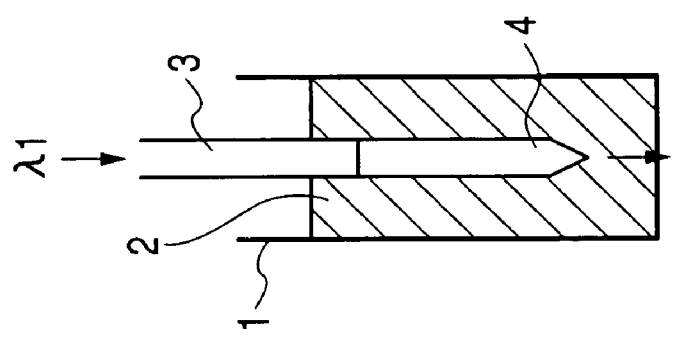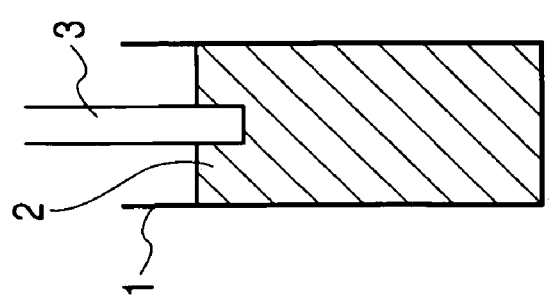

OPTICAL WAVEGUIDE AND METHOD FOR PRODUCING THE SAME

This application is based on Japanese Patent Applications No. 2003-290914 and 2003-290915, which are incorporated herein by reference.

BACKGROUND OF THE INVENTION

1. Field of the Invention

The present invention relates to a method for producing an optical waveguide easily and inexpensively and a composition of material adapted for the method. The present invention also relates to a self-written optical waveguide having a columnar core made of the cured of a photo-curable resin solution. The term "photo-curable resin solution" used in the invention means a mixture of a photopolymerization initiator and at least one of photopolymerizable monomer, photopolymerizable macro-monomer and photopolymerizable oligomer.

2. Description of the Related Art

Attention has been paid to a technique of leading a light beam with a predetermined wavelength into a photo-curable resin solution to thereby use a self-focusing phenomenon to form an optical waveguide device. For example, a method for producing an optical waveguide has been described in each of JP-A-2000-347043 and JP-A-2002-169038 by joint applicants of the invention. On the other hand, there is known a technique described in each of JP-A-2002-31733 and JP-A-2002-258095 by other applicants than the joint applicants of the invention. In each of these proposed techniques, a core with a high refractive index is formed while all the outside for covering the core is formed as a clad with a low refractive index. On this occasion, after a photo-curable resin solution with a high refractive index is cured to form a core, a photo-curable resin solution with a low refractive index provided in the outside of the core or a mixture solution containing a photo-curable resin solution with a high refractive index and a photo-curable resin solution with a low refractive index provided in the outside of the core is cured.

On the other hand, according to Japanese Patent Application No. 2002-313421 by the joint applicants of the invention, there has been proposed a method for producing an optical waveguide by using a mixture solution containing a photo-curable resin solution with a high refractive index and a photo-curable resin solution with a low refractive index, comprising the steps of: curing the low-refractive-index photo-curable resin solution selectively while enveloping the high-refractive-index photo-curable resin solution in the low-refractive-index photo-curable resin solution; attaching the cured of the low-refractive-index photo-curable resin solution to an outer circumferential portion by leakage light rays; and curing all uncured part of the mixture solution. This optical waveguide producing method is quite different from the techniques described in JP-A-2000-347043, JP-A-2002-169038, JP-A-2002-31733 and JP-A-2002-258095. That is, this is a method for producing an optical waveguide including a high-refractive-index optical path portion as the cured of the mixture solution, a low-refractive-index portion rich in low-refractive-index resin component formed on the outer circumference of the optical path portion, and a high-refractive-index portion further formed as the cured of the mixture solution on the outside of the low-refractive-index portion.

In the related art according to JP-A-2000-347043, JP-A-2002-169038, JP-A-2002-31733 and JP-A-2002-258095, that is, in the technique of curing the high-refractive-index photo-curable resin solution to form a core and then curing the mixture solution of the high-refractive-index photo-curable resin solution and the low-refractive-index photo-curable resin on the outside of the core, it is necessary to selectively cure the high-refractive-index photo-curable resin solution. On this occasion, the maximum core-forming speed is limited to a predetermined value if the high-refractive-index photo-curable resin solution in the mixture solution of the high-refractive-index photo-curable resin solution and the low-refractive-index photo-curable resin solution is selectively cured to form a core so that the low-refractive-index photo-curable resin solution is not contained in the core as perfectly as possible, that is, the low-refractive-index photo-curable resin solution is diffused to the outside as sufficiently as possible. Moreover, if a core is formed from only the high-refractive-index photo-curable resin solution and then a clad is formed on the outside of the core after cleaning, the time required for production of the optical waveguide becomes longer.

Incidentally, optical waveguides have been described in JP-A-8-320422 and JP-A-11-326660. In each of techniques disclosed in JP-A-8-320422 and JP-A-11-326660, a light beam is applied on a photo-curable resin solution through an optical fiber or the like so that a columnar cured resin is formed by a self-focusing phenomenon. In each of the optical waveguides, the columnar cured resin is used as a core. In these techniques, it is necessary to remove uncured part of the photo-curable resin solution from the periphery of the core. As measures to remove uncured part of the photo-curable resin solution, use of a solvent such as toluene has been proposed. On the other hand, the present inventors have developed a technique disclosed in JP-A-2000-347043 and have gotten a patent (Japanese Patent No. 3,444,352). This technique has disclosed conditions adapted to the case where a light beam used for curing a photo-curable resin solution is led into the photo-curable resin solution through an optical fiber so that a columnar cured resin having a diameter nearly equal to the diameter of a core portion of the optical fiber is formed with an end of the optical fiber as a start point. When uncured part of the photo-curable resin solution is removed and the circumference of cured part of the photo-curable resin solution is surrounded by a resin having a refractive index lower than the refractive index of the cured part of the photo-curable resin solution, a module etc. containing the cured resin formed previously and having a higher refractive index as an optical waveguide can be formed easily. Incidentally, when a light beam capable of curing only a high-refractive-index photo-curable resin solution is led into a mixture solution containing the high-refractive-index photo-curable resin solution and a low-refractive-index photo-curable resin solution through an optical fiber, a columnar cured resin can be formed more easily. This technique has been also disclosed in JP-A-2000-347043.

When a high-refractive-index photo-curable resin solution which is not a mixture solution of a high-refractive-index photo-curable resin solution and a low-refractive-index resin solution is used for forming a columnar cured resin, it is necessary to fill a vessel etc. with another photo-curable resin, for example, having a lower refractive index after uncured part of the high-refractive-index photo-curable resin solution is removed from the vessel as perfectly as possible. If uncured part of the high-refractive-index photo-curable resin solution remains on the outer circumference of the core, the shape of the core will change from a designed shape at a connection portion between the vessel etc. and the core when uncured part of the high-refractive-index photo-curable resin solution is entirely cured because uncured part of the high-refractive-index photo-curable resin solution remains particularly in the connection portion.

More specifically, when a self-written optical waveguide needs to be formed in combination with a total reflection mirror, a half mirror or a dichroic mirror as shown in FIG. 10A, there is a possibility that the shape at a connection portion between the core 105 and the total reflection mirror 107, the half mirror 106 or the dichroic mirror will change totally from a designed shape as shown in FIG. 10B unless uncured part 111 of the high-refractive-index photo-curable resin solution is removed perfectly after the core 105 is formed. It is however not easy to remove uncured part of the photo-curable resin solution perfectly because the viscosity of the photo-curable resin solution is generally so high that uncured part of the photo-curable resin solution is deposited on the cured core portion by surface tension. If the removal of uncured part of the photo-curable resin solution is imperfect, the following problem will occur.

First, if uncured part of the photo-curable resin solution is cured after a material for forming a clad is embedded while the uncured part of the photo-curable resin solution is deposited on the core portion, the outer surface of the core becomes so bumpy that a scattering loss increases. In a complex portion such as a branch portion, a redundant loss such as a branch loss increases. Incidentally, the possibility that uncured part of the photo-curable resin solution will remain in the branch portion is a significant issue even in the case where the viscosity of the photo-curable resin solution is low. Even in the case where uncured part of the photo-curable resin solution is not deposited on the core, uncured part of the photo-curable resin solution may cause scattering of stray light or peeling of the clad from a housing or another optical component if the uncured part of the photo-curable resin solution remains in the inside of the housing or on the optical component. As a result, the uncured part of the photo-curable resin solution may exert not a little bad influence on communication characteristic so that the influence leads to lowering of reliability.

Incidentally, use of a solvent may exert the following bad influence. First, the process of filling the vessel with a solvent, cleaning the vessel and drying the vessel increases. The characteristic of the core member deteriorates because the core member may be swollen or deformed by the solvent. The respective optical components, the core and the housing are destroyed easily because of peeling when the solvent penetrates into the interface between any two of the respective optical components, the core and the housing. Penetration of the solvent into the core makes optical characteristic deteriorate.

SUMMARY OF THE INVENTION

The present inventors have made examination eagerly for greater improvement in the technique described in Japanese Patent Application No. 2002-313421. As a result, easier production of an optical waveguide and improvement in production efficiency have been achieved. That is, a subject of the invention is a method for producing an optical waveguide including a high-refractive-index optical path portion formed as the cured part of a mixture solution, a low-refractive-index portion richer in low-refractive-index resin component formed on the outer circumference of the optical path portion, and a high-refractive-index portion formed as the cured part of the mixture solution on the outside of the low-refractive-index portion.

According to the first aspect of the invention, there is provided a method of producing an optical waveguide containing a high-refractive-index optical path portion and a low-refractive-index portion as a surface layer of the optical path portion by using a mixture solution containing a first photo-curable resin solution with a low refractive index and a second photo-curable resin solution with a high refractive index different in curing mechanism, comprising the steps of: irradiating the mixture solution with a first light beam capable of curing the first photo-curable resin solution but incapable of curing the second photo-curable resin solution so that the first photo-curable resin solution is cured while the second photo-curable resin solution is enveloped in the cured of the first photo-curable resin solution to thereby form a light-transmissive optical path portion (first photo-curing step); stopping irradiation with the first light beam after the formation of the optical path portion and leaving the mixture solution at rest for a predetermined time so that uncured part of the first photo-curable resin solution is diffused from the mixture solution on the outside of the optical path portion into a surface layer of the optical path portion (diffusing step); and irradiating the mixture solution with a second light beam capable of curing both the first photo-curable resin solution and the second photo-curable resin solution so that at least uncured part of the first photo-curable resin solution diffused into the surface layer of the optical path portion and the second photo-curable resin solution in the optical path portion are cured (second photo-curing step). In the method, the first light beam may be applied on the mixture solution through an optical fiber. Incidentally, in the invention, the configuration of the high-refractive-index optical path portion and the low-refractive-index portion as the surface layer of the optical path portion is not limited to an embodiment in which a so-called step index type refractive index distribution is formed. That is, the invention may be also applied to the case where the refractive index changes continuously, such as an embodiment in which a so-called graded index type refractive index distribution is formed.

The operation of the invention will be described. First, an optical path portion which is optically transparent is formed selectively. Incidentally, the optical path portion is formed in such a manner that the second photo-curable resin solution with a high refractive index is enveloped in the cured of the first photo-curable resin solution with a low refractive index in the condition that the second photo-curable resin solution has been not cured yet. That is, the optical path portion will serve as an optical path having a designed refractive index, that is, a refractive index obtained by curing of the initial mixture solution when all the uncured part of the second photo-curable resin solution will be cured in the after-step. On this occasion, the cured of the first photo-curable resin solution with a low refractive index may contain uncured part of the first photo-curable resin solution or may contain no uncured part of the first photo-curable resin solution.

Then, light irradiation is stopped. At this point of time, the ratio of the concentration of uncured part of the first photo-curable resin solution to the concentration of uncured part of the second photo-curable resin solution in the liquid component enveloped in the cured of the first photo-curable resin solution with a low refractive index is lower than the ratio of the concentration of uncured part of the first photo-curable resin solution to the concentration of uncured part of the second photo-curable resin solution in the initial mixture solution in accordance with the solid component formed as the cured of the first photo-curable resin solution. On the other hand, the outside of the optical path portion is filled with the initial mixture solution, so that the ratio of the concentration of uncured part of the first photo-curable resin solution to the concentration of uncured part of the second photo-curable resin solution in the outside of the optical path portion is kept constant. As a result, when light irradiation is stopped, the outside of the optical path portion and the surface layer of the optical path portion become adjacent to each other with the optical path surface as a boundary in the condition that the ratio of the concentration of uncured part of the first photo-curable resin solution to the concentration of uncured part of the second photo-curable resin solution in the outside of the optical path portion is kept equal to the ratio in the initial mixture solution while the ratio of the concentration of uncured part of the first photo-curable resin solution to the concentration of uncured part of the second photo-curable resin solution in the surface layer of the optical path portion is lower than the ratio in the initial mixture solution.

On the basis of the concentration ratio difference, uncured part of the first photo-curable resin solution is diffused from the mixture solution in the outside of the optical path portion into the surface layer of the optical path portion while uncured part of the second photo-curable resin solution is diffused from the surface layer of the optical path portion into the mixture solution in the outside of the optical path portion. In this manner, the concentration of uncured part of the first photo-curable resin solution and the concentration of uncured part of the second photo-curable resin solution in the liquid component in the surface layer of the optical path portion extremely approach those in the outside of the optical path portion. Although this diffusion is spread to the inside of the optical path portion, the diffusing speed is very low in the optical path portion except the surface layer of the optical path portion because the cured of the first photo-curable resin solution serves as a barrier to the diffusion. On the other hand, it is conceived that the diffusing speed in the outside of the optical path portion depends on the viscosity of the mixture solution and is relatively high.

The aforementioned diffusion is generated to reduce the difference in the ratio of the concentration of uncured part of the first photo-curable resin solution to the concentration of uncured part of the second photo-curable resin solution in the liquid component. Incidentally, the cured resin as the cured of the first photo-curable resin solution with a low refractive index is present in the surface layer of the optical path portion. Accordingly, when the second light beam is applied to cure all the residual uncured part of the photo-curable resin solutions, the concentration of cured part of the first photo-curable resin solution in the cured resin in the surface layer of the optical path portion becomes higher than the concentration of cured part of the first photo-curable resin solution in the cured resin in the outside of the optical path portion. As a result, the concentration of cured part of the first photo-curable resin solution with a low refractive index in the surface layer of the optical path portion is higher than the concentration of cured part of the first photo-curable resin solution with a low refractive index in the cured resin in the outside of the optical path portion. What is meant by this is the fact that the refractive index of the surface layer of the optical path portion becomes lower than the refractive index of the cured resin in the outside of the optical path portion.

The diffusion of uncured part of the first photo-curable resin solution in the aforementioned liquid component has little influence on the neighbor of the center axis of the optical path portion. Accordingly, after curing, the concentration of cured part of the first photo-curable resin solution in the optical path portion is nearly equal to the concentration of cured part of the first photo-curable resin solution in the outside of the optical path portion. Recapitulating the above description, the optical waveguide is formed so that the optical path portion is formed as a portion with a high refractive index, the surface layer of the optical path portion is formed as a portion with a low refractive index and the outside of the optical path portion is formed as a portion with a high refractive index. Although the optical waveguide according to the invention is different from a so-called step index optical waveguide, the optical path portion except the surface layer will be hereinafter called "core" and the surface layer of the optical path portion will be hereinafter called "clad". Incidentally, the "optical path portion" formed by irradiation with the first light beam is a portion which will be processed into a core and a clad in the after-step, so that the surface layer of the optical path portion is formed in the inside of the optical path portion.

For the formation of the optical path portion, rapid photo-curing is performed so that uncured part of the second photo-curable resin solution with a high refractive index is enveloped in the cured of the first photo-curable resin solution with a low refractive index. When light irradiation is stopped and the mixture solution is left at rest for a predetermined time after the photo-curing, a portion in which the concentration of the low-refractive-index resin is higher than the initial concentration of the low-refractive-index resin in the mixture solution can be formed in the surface layer of the optical path portion. When all the uncured part of the mixture solution is cured after that, the formation of the optical waveguide can be completed. As described above, in accordance with the invention, the optical waveguide can be produced easily and efficiently compared with any one of the background techniques which have been already developed by the inventors. The cleaning step need not be provided in the invention after the formation of the core. Accordingly, relatively high viscosity monomers or the like can be used as photo-curable resin solutions, so that the invention is adapted for mass production of small-size optical modules.

Moreover, when irradiation with the first light beam is performed through an optical fiber, an optical waveguide having a small-diameter core matched with the optical fiber can be produced easily.

Further, the method according to the invention can be applied to the production of inexpensive low-loss optical waveguide parts such as an optical interconnection, an optical demultiplexer and an optical multiplexer in the field of optical fiber communication.

Incidentally, another object of the invention is to provide an optical waveguide which can be formed easily by using self-focusing without use of any solvent.

According to the second aspect of the invention, there is provided a self-written optical waveguide comprising a core having at least one part shaped like a column, and a clad which has a refractive index lower than that of the core and with which the circumference of the core is covered, wherein: a resin used for forming the core is the cured of a first curable resin solution capable of being cured by a light beam with a certain wavelength whereas a resin used for forming the clad is mainly the cured of a second curable resin solution which is different in at least composition from the first curable resin solution and which has mutual solubility for the first curable resin solution; each of the first and second curable resin solutions has a coefficient of viscosity not higher than 1500 mPa·s; and the difference between solubility parameter of the first curable resin solution and solubility parameter of the second curable resin solution is not larger than 4.4 MPa$^{1/2}$.

The viscosity of each of the first and second curable resin solutions and the solubility parameter difference between the first and second curable resin solutions substantially have no lower limits and can be selected from ranges based on common sense.

According to the invention, there is provided a self-written optical waveguide comprising a core having at least one part shaped like a column, and a clad which has a refractive index lower than that of the core and with which the circumference of the core is covered, wherein: a resin used for forming the core is the cured of a first curable resin solution capable of being cured by a light beam with a certain wavelength whereas a resin used for forming the clad is mainly the cured of a second curable resin solution which is different in at least composition from the first curable resin solution; and the difference between specific gravity of the first curable resin solution and specific gravity of the second curable resin solution is not smaller than 0.14.

The specific gravity difference substantially has no upper limit and can be selected from a range based on common sense.

The core may have a branched or bent portion in a junction between the core and one of a total reflection mirror, a half mirror and a dichroic mirror.

Further, the second curable resin solution may be a photo-curable resin.

According to the invention, there is provided a method of producing a self-written optical waveguide including a core having at least one part shaped like a column, and a clad which has a refractive index lower than that of the core and with which the circumference of the core is covered, the method comprising the steps of: putting a first curable resin solution capable of being cured by a light beam with a certain wavelength in a desired vessel; irradiating the first curable resin solution with the light beam to cure the first curable resin solution to thereby form a core having at least one part shaped like a column; taking a large part of uncured part of the first curable resin solution out of the vessel after the formation of the core having a desired shape; filling the vessel containing the core formed as the cured of the first curable resin solution with a second curable resin solution different in at least composition from the first curable resin solution and having mutual solubility for the first curable resin solution so that uncured part of the first curable resin solution remaining in the vessel is dissolved in the second curable resin solution; and curing uncured part of the first curable resin solution and the second curable resin solutions wherein: each of the first and second curable resin solutions has a coefficient of viscosity not higher than 1500 mPa·s; and the difference between solubility parameter of the first curable resin solution and solubility parameter of the second curable resin solution is not larger than 4.4 MPa$^{1/2}$.

Incidentally, the coefficient of viscosity is measured at a temperature when the vessel is filled with the second curable resin solution. The viscosity of each of the first and second curable resin solutions and the solubility parameter difference between the first and second curable resin solutions substantially have no lower limits and can be selected from ranges based on common sense.

The step of taking the large part of uncured part of the first curable resin solution out of the vessel and the following steps are replaced by the steps of: taking the core out of the vessel and incorporating the core in another vessel, filling the vessel containing the core with a second curable resin solution; and curing uncured part of the first curable resin solution and the second curable resin solution in the same manner as described in the invention.

According to the invention, there is provided a method of producing a self-written optical waveguide including a core having at least one part shaped like a column, and a clad which has a refractive index lower than that of the core and with which the circumference of the core is covered, the method comprising the steps of: putting a first curable resin solution capable of being cured by a light beam with a certain wavelength in a desired vessel; irradiating the first curable resin solution with the light beam to cure the first curable resin solution to thereby form a core having at least one part shaped like a column; taking a large part of uncured part of the first curable resin solution out of the vessel after the formation of the core having a desired shape; filling the vessel containing the core formed as the cured of the first curable resin solution with a second curable resin solution different in at least composition from the first curable resin solution so that uncured part of the first curable resin solution remaining in the vessel is moved up or down in the vessel by the second curable resin solution; and curing uncured part of the first curable resin solution and the second curable resin solution, wherein the difference between specific gravity of the first curable resin solution and specific gravity of the second curable resin solution is not smaller than 0.14.

The specific gravity difference substantially has no upper limit and can be selected from arrange based on common sense.

The step of taking the large part of uncured part of the first curable resin solution out of the vessel and the following steps can be replaced by the steps of: taking the core out of the vessel and incorporating the core in another vessel; filling the vessel containing the core with a second curable resin solution; and curing uncured part of the first curable resin solution and the second curable resin solution in the same manner as described in the invention.

Incidentally, at least one of a total reflection mirror, a half mirror and a dichroic mirror is disposed in the vessel; and a branched or bent portion of the core is formed while a junction between the core and one of the total reflection mirror, the half mirror and the dichroic mirror is formed in the step for forming the core shaped like a column.

Further, at least one of a total reflection mirror, a half mirror and a dichroic mirror is disposed in the vessel used for forming the core; a branched or bent portion of the core is formed while a junction between the core and one of the total reflection mirror, the half mirror and the dichroic mirror is formed in the step for forming the core shaped like a column; and in the condition that the branched or bent portion of the core is integrated with one of the total reflection mirror, the half mirror and the dichroic mirror, the core is taken out of the vessel and incorporated in another vessel in the step of taking the core out of the vessel and incorporating the core in the other vessel.

The second curable resin solution may be a photo-curable resin.

When the second curable resin solution having a low coefficient of viscosity and having high mutual solubility for uncured part of the first curable resin solution is injected into the vessel, the uncured part of the first curable resin solution deposited on the outer surface of the core and the inner surface of the vessel is diffused into the second curable resin solution so that the uncured part of the first curable resin solution does not remain on the outer surface of the core and the inner surface of the vessel. Even in the case where the uncured part of the first curable resin solution is not diffused into the second curable resin solution, the uncured part of the first curable resin solution is moved above or below the second curable resin solution if the specific gravity difference between the first and second curable resin solutions is large. As a result, the uncured part of the first curable resin solution cannot remain on the outer surface of the core.

When the second curable resin solution has a low coefficient of viscosity and has high mutual solubility for uncured part of the first curable resin solution, the uncured part of the first curable resin solution can be removed from the outer surface of the core in such a manner that the uncured part of the first curable resin solution is dissolved and dispersed into the second curable resin solution. When the specific gravity difference between the first and second curable resin solutions is large, the uncured part of the first curable resin solution can be removed from the outer surface of the core. These effects are particularly useful in the case where a curable resin solution particularly having high viscosity is cured in a vessel having a relatively small volume of from 1 to several $cm^3$ to form an optical waveguide. When the second curable resin solution is a photo-curable resin, the second curable resin solution can be cured together with the remaining uncured part of the first curable resin. The invention is particularly adapted to a branched or bent portion (reflecting portion)—including optical waveguide having at least one of a total reflection mirror, a half mirror and a dichroic mirror and to a method for producing the optical.

BRIEF DESCRIPTION OF DRAWINGS

FIGS. 1A to 1D are process views (sectional views) showing a method for producing an optical waveguide according to a specific embodiment of the invention;

DETAILED DESCRIPTION OF THE PREFERRED EMBODIMENTS

Figure 2:
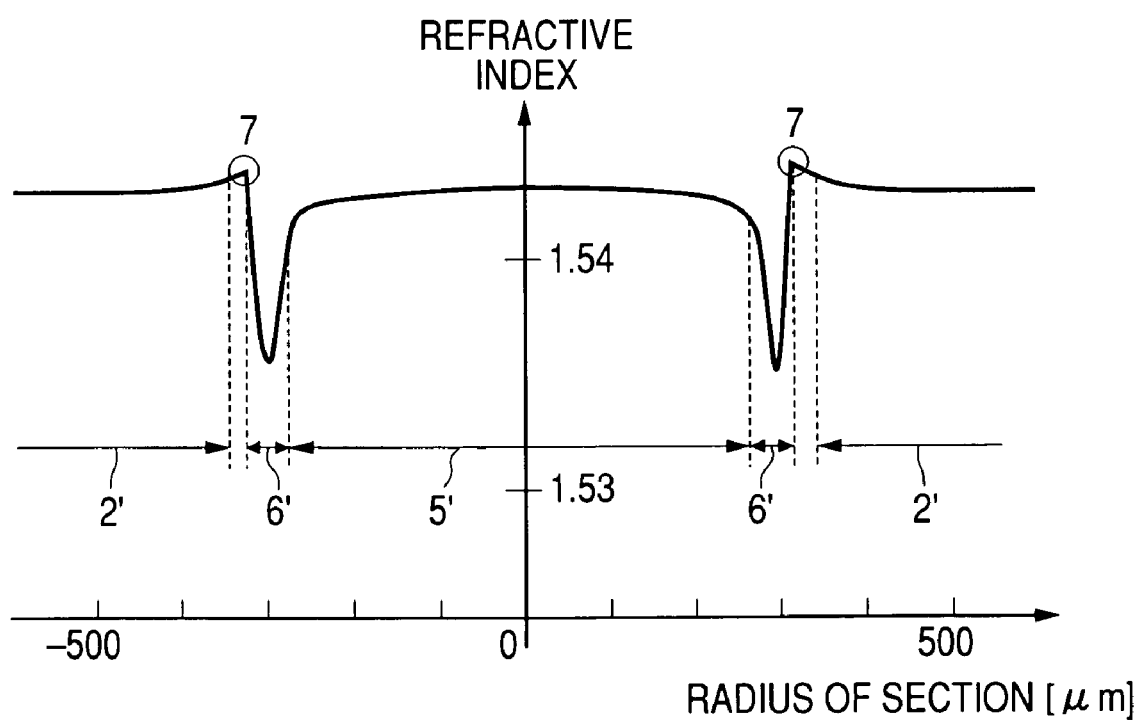
FIG. 2 is a graph showing a refractive index distribution in a direction perpendicular to the center axis of a core portion of the optical waveguide according to Example 1.

Specific examples of configuration for carrying out the invention are as follows. First, it is necessary to prepare two photo-curable resin solutions different in curing mechanism. For example, two kinds may be selected from radical polymerization, cationic polymerization and anionic polymerization so that two photo-curable resin solutions can be made different in curing mechanism. A photopolymerization initiator for low-refractive-index photo-curable resin solution may be preferably selected so as to be activated by light with a shorter wavelength than the wavelength of light which activates a photopolymerization initiator for high-refractive-index photo-curable resin solution.

(Meth)acrylic ester or (meth)acrylamide may be preferably used as a monomer to be subjected to radical photopolymerization. Specifically, monofunctional (meth)acrylic ester (mono(meth)acrylate) such as 2-ethylhexyl (meth)acrylate, cyclohexyl (meth)acrylate or 2-butoxyethyl (meth)acrylate may be used. Di(meth)acrylic ester (di(meth)acrylate) of diol such as ethylene glycol, neopentyl glycol or 1,6-hexanediol may be also used. (Meth)acrylic ester (such as tri(meth)acrylate or tetra(meth)acrylate) of an organic compound having a plurality of alcoholic hydroxyl groups may be also used. Incidentally, in each of these monomers, methyl hydrogen, methylene hydrogen and methine hydrogen contained in (meth)acryloyl group and other organic structures may be partially replaced by halogen. Or several monomers suitably selected from these monomers may be used in combination.

Urethane oligomer, polyether oligomer, epoxy oligomer, polyester oligomer etc. having a (meth)acryloyl group at a terminal or chain portion may be preferably used as an oligomer (macro-monomer) to be subjected to radical photopolymerization. Incidentally, in each of these oligomers, methyl hydrogen, methylene hydrogen and methine hydrogen contained in (meth)acryloyl group and other organic structures may be partially replaced by halogen. Or several oligomers suitably selected from these oligomers may be used in combination with the aforementioned monomers.

Examples of the radical photopolymerization initiator which can be used include: benzyl dimethyl ketal compounds such as 2,2-dimethoxy-2-phenylacetophenone; α-hydroxy ketone compounds such as 2-hydroxy-2-methylphenylpropane-1-one and (1-hydroxycylohexyl)-phenylketone; α-amino ketone compounds such as 2-benzyl-2-dimethylamino-1-(4-morpholinophenyl)-butane-1-one and 2-methyl-1-(4-(methylthio)phenyl)-2-morpholinopropane-1-one; bisacyl phosphine oxide compounds such as bis(2,6-dimethoxybenzoyl)-2,4,4-trimethyl-pentylphosphine oxide and bis(2,4,6-trimethylbenzoyl)-phenylphosphine oxide; and metallocene compounds such as bis(η-cyclopentadienyl)-bis(2,6-difluoro-3-(N-pyroyl)phenyl)titanium. A plurality of kinds selected from these examples may be used in combination.

Monomer or oligomer such as a cyclic ether compound having an epoxy ring, an oxetane ring or the like, a cyclic lactone compound, a cyclic acetal compound or a vinyl ether compound may be used as a monomer or oligomer to be subjected to cationic photopolymerization. Several monomers or oligomers suitably selected from these monomers or oligomers may be used in combination.

Examples of the cationic photopolymerization initiator which can be used include
4,4'-bis(di(2-hydroxyethoxy)phenylsulfonyl)phenylsulfide dihexafluoroantimonate, and
η-cyclopentadienyl-η-cumeneiron$^{(1+)}$-hexafluorophosphate$^{(1-)}$.

A photo sensitizer may be added into the radical photopolymerization initiator or the cationic photopolymerization initiator. Additives such as a polymerization inhibitor, an ultraviolet absorber, a light stabilizer, an anti-oxidant, a leveling agent and an anti-foaming agent may be further mixed with the radical photopolymerization initiator or the cationic photopolymerization initiator as occasion demands. A photo-curable liquid resin composition used in the invention can be prepared by the aforementioned combination. A combination of the anionic photopolymerization initiator and the monomer or oligomer may be used or polymerization due to addition of thiol/ene may be used.

First Embodiment

Sixty parts of radical polymerizable monomer (trade name "SR-454" made by Sartomer Company) with a refractive index of 1.471 and 0.5 parts of radical polymerization type visible-light photopolymerization initiator as the first photo-curable resin solution, and 40 parts of cationic polymerizable monomer (trade name "EPIKOTE 828" made by Japan Epoxy Resin Co., Ltd.) with a refractive index of 1.574 and 3.0 parts of cationic polymerization type ultraviolet-light photopolymerization initiator as the second photo-curable resin solution were mixed to prepare a mixture of the photo-curable resin solutions. The refractive index of the mixture solution was 1.514 before the mixture solution was cured. The refractive index of the cured of the mixture solution was 1.543 after the mixture solution was entirely cured by irradiation with ultraviolet rays. In Example 1, a mixture of the radical polymerizable monomer (trade name "SR-454") with a refractive index of 1.471 and the radical polymerization type visible-light photopolymerization initiator is equivalent to the first photo-curable resin solution whereas a mixture of the cationic polymerizable monomer (trade name "EPIKOTE 812B") and the cationic polymerization type ultraviolet-light photopolymerization initiator is equivalent to the second photo-curable resin solution. Incidentally, respective trade names and chemical names of main components are shown in Table 1.

TABLE 1

| Trade Name | Chemical Name of Main Component |
| --- | --- |
| SR-454 | EO-modified trimethylolpropane triacrylate |
| EPIKOTE 828 | bisphenol A glycidyl ether |

FIGS. 1A to 1D are process views showing a process in this embodiment. First, as shown in FIG. 1A, one side of a plastic optical fiber 3 was immersed in a transparent vessel 1 filled with the aforementioned mixture solution 2. Trade name "ESKA-MIU" (core diameter: 0.73 mm, numerical aperture: 0.25) made by Mitsubishi Rayon Co., Ltd. was used as the plastic optical fiber 3.

Then, a laser beam $\lambda_1$ with a wavelength of 458 nm was made incident on the other end of the plastic optical fiber 3 so as to be led from the immersed end of the plastic optical fiber 3 into the mixture solution 2. The power of the laser beam $\lambda_1$ was set at 5 mW. In this manner, only the radical polymerization initiator in the mixture solution 2 was activated successively from the immersed end of the plastic optical fiber 3 by a self-focusing phenomenon, so that the radical polymerizable monomer (first photo-curable resin solution) with a refractive index of 1.471 was cured axially while the uncured cationic polymerizable monomer (second photo-curable resin solution) with a refractive index of 1.574 was enveloped in the radical polymerizable monomer to thereby grow a partially uncured optical path portion 4 (FIG. 1B). Thus, the partially uncured optical path portion 4 having a length of 18 mm was formed for 16 seconds. Then, the laser beam $\lambda_1$ with a wavelength of 458 nm was stopped and the transparent vessel 1 was left at rest for 15 minutes. On this occasion, it became clear that the uncured radical polymerizable monomer was dispersed in a surface layer 6 of the partially uncured optical path portion 4 as will be described later. On the other hand, it became clear that the uncured radical polymerizable monomer was little dispersed in the other portion 5 of the partially uncured optical path portion 4 than the surface layer 6 (FIG. 1C).

Then, the transparent vessel 1 was irradiated with ultraviolet rays emitted from a high-pressure mercury lamp to the outside of the transparent vessel 1 to activate both radical polymerization initiator and cationic polymerization initiator in the mixture solution 2 to thereby cure all the residual uncured radical polymerizable monomer and cationic polymerizable monomer. In this manner, the other portion 5 of the partially uncured optical path portion 4 than the surface layer 6, the surface layer 6 of the optical path portion 4 and the mixture solution 2 were provided as a triple structure having a core portion 5' with a high refractive index, a clad portion 6' with a low refractive index, and the cured 2' of the mixture solution which was a high refractive index portion surrounding the clad portion 6'. Thus, an optical waveguide 10 was formed (FIG. 1D). Incidentally, the second photocuring step is not limited to the case where ultraviolet rays are applied from the outside of the transparent vessel. For example, ultraviolet rays may be applied from the optical path portion. In this case, an optical waveguide having no cured 2' of the mixture solution can be formed in accordance with the purpose of use.

Both transmission loss and connection loss in the optical waveguide 10 were measured by a cutback method. As a result, the transmission loss and connection loss were 2.1 dB/cm and 0.42 dB respectively. The refractive index distribution in the optical waveguide 10 was also measured with a two-beam interference microscope. As a result, the refractive index distribution was observed in a direction perpendicular to the lengthwise direction of the optical waveguide 10 (the center axis of the core portion 5'). FIG. 2 is a graph showing the refractive index distribution in a direction (i.e. a direction of the radius of a section) perpendicular to the center axis (with the sectional radius of 0 μm) of the core portion 5' of the optical waveguide 10. The neighbor of the center axis of the core portion 5' has a refractive index equal to the refractive index of 1.543 obtained when the mixture solution 2 is cured as it is. The refractive index slightly decreases monotonously and then decreases rapidly to 1.535 in the clad portion 6' as the location becomes farther from the center axis. Then, after the portion 7 with a refractive index of 1.544 slightly higher than the refractive index of 1.543 obtained when the mixture solution 2 is cured as its is, the portion 2' with a refractive index of 1.543 obtained when the mixture solution 2 is cured as it is, continues until the portion 2' reaches the transparent vessel 1. Incidentally, the change in refractive index is very continuous. That is, the refractive index change is different from that in a so-called step index optical waveguide and also different from that in a so-called graded index optical waveguide. This distribution however shows an example. Because the distribution largely depends on used materials (especially, viscosity, molecular weight of each monomer, etc.) and the condition (temperature and time) for leaving the vessel at rest, the invention is not limited to the case where the distribution in FIG. 2 is generated.

The resin composition in the radial direction with respect to the neighbor of the center axis of the core portion 5' was analyzed by FT-IR. As a result, the composition ratio of the radical polymerization cured resin to the cationic polymerization cured resin in the neighbor of the center axis of the core portion 5' was 0.6:0.4 whereas the composition ratio in the portion with the lowest refractive index was 0.69:0.31.

The following fact can be considered from the composition analysis. When irradiation with the light beam $\lambda_1$ is stopped, the surface layer 6 of the partially uncured optical path portion 4 contains the low-refractive-index radical polymerization cured resin (the cured of the first photo-curable resin), and the high-refractive-index cationic polymerizable monomer (uncured second photo-curable resin solution) enveloped in the low-refractive-index radical polymerization cured resin. Even in the case where the surface layer 6 contains the low-refractive-index radical polymerizable monomer (uncured first photo-curable resin solution), the composition ratio of the low-refractive-index radical polymerizable monomer (uncured first photo-curable resin solution) to the high-refractive-index cationic polymerizable monomer (uncured second photo-curable resin solution) is lower than 6:4 because part of the low-refractive-index radical polymerizable monomer (uncured first photo-curable resin solution) is spent by curing. As occasion demands, the composition ratio may be 0:4, that is, there is a possibility that the low-refractive-index radical polymerizable monomer (uncured first photo-curable resin solution) will become absent.

The outside of the optical path portion 4, however, contains the low-refractive-index radical polymerizable monomer (and the radical polymerization initiator as uncured first photo-curable resin solution), and the high-refractive-index cationic polymerizable monomer (and the cationic polymerization initiator as uncured second photo-curable resin solution) at a composition ratio of 6:4. The difference between the concentration of the low-refractive-index radical polymerizable monomer (uncured first photo-curable resin solution) and the concentration of the high-refractive-index cationic polymerizable monomer (uncured second photo-curable resin solution) with the surface of the optical path portion 4 as a boundary causes diffusion That is, the uncured first photo-curable resin solution is diffused from the outside of the optical path portion 4 to the surface layer 6 of the optical path portion 4 while the uncured second photo-curable resin solution is diffused from the surface layer 6 of the optical path portion 4 to the outside of the optical path portion 4. As a result, the difference between the concentration of the low-refractive-index radical polymerizable monomer (uncured first photo-curable resin solution) and the concentration of the high-refractive-index cationic polymerizable monomer (uncured second photo-curable resin solution) with the surface of the optical path portion 4 as a boundary is reduced.

The above description concerns concentration (composition) in the liquid portion of the surface layer 6 of the optical path portion 4 and the outside of the optical path portion 4. The surface layer 6 of the optical portion 4, however, contains the low-refractive-index radical polymerization cured resin (the cured of the first photo-curable resin), As a result, after all the residual uncured photo-curable resin is cured by irradiation with ultraviolet rays, the composition percentage of the low-refractive-index radical polymerization cured resin (the cured of the first photo-curable resin) in the surface layer 6 of the optical path portion 4 is higher than the composition percentage of the low-refractive-index radical polymerization cured resin (the cured of the first photo-curable resin) in the outside of the optical path portion 4. That is, the surface layer 6 of the optical path portion 4 is provided as a low-refractive-index portion. On the other hand, at least the neighbor of the center axis in the inside of the optical path portion 4 has a composition ratio equal to the composition ratio of the cured of the first and second photo-curable resins in the case where the mixture solution is cured, because the diffusion has little influence on the neighbor of the center axis. When consideration is given to the fact that the concentration change due to the diffusion is very continuous, it is examined that the composition change in the cured of the first and second photo-curable resins to generate the refractive index distribution as shown in FIG. 2 is caused by the aforementioned function.

COMPARATIVE EXAMPLE

An optical waveguide was produced in the same manner as in Example 1 except that ultraviolet rays emitted from a high-pressure mercury lamp are applied onto the transparent vessel 1 from the outside of the transparent vessel 1 at the same time when the formation of the partially uncured optical path portion 4 was terminated while irradiation with the laser beam $\lambda_1$ having a wave length of 458 nm was stopped without leaving the transparent vessel 1 at rest for 15 minutes. The optical waveguide did not function as an optical waveguide function satisfactorily, that is, light could not be confined in the optical waveguide. The refractive index distribution was measured with a two-beam interference microscope. As a result, the refractive index difference in the inside of the optical waveguide was not larger than 0.001. It was obvious from the refractive index difference that the "diffusion" described in the aforementioned consideration could not occur if the transparent vessel was not left at rest for a predetermined time.

VERIFYING EXPERIMENT

It was confirmed by the following method that the uncured monomer in the inside of a partially cured core and the uncured monomer in the outside of the core in the mixture solution were dispersed into each other when the partially cured core was formed. First, mixture solutions A, B, C and D were prepared as shown in Table 2. Incidentally, polymerization initiators the same as those used in Example 1 were used.

TABLE 2

| Solution | Radical Polymerizable Monomer | Cationic Polymerizable Monomer | Note | Refractive Index Difference |
|---|---|---|---|---|
| A | 50 parts of SR-454 | 50 parts of EPIKOTE-828 | W | 0.0129 |
| B | 50 parts of SR-454 | 30 parts of EPIKOTE-828 and 20 parts of phenyl glycidyl ether made by Wako Pure Chemical Industries, Ltd. | W | 0.0102 |

TABLE 2-continued

| Solution | Radical Polymerizable Monomer | Cationic Polymerizable Monomer | Note | Refractive Index Difference |
|---|---|---|---|---|
| C | 50 parts of SR-454 | 30 parts of EPIKOTE-828 and 20 parts of butyl glycidyl ether made by Wako Pure Chemical Industries, Ltd. | M | 0.0062 |
| D | 50 parts of SR-454 | 30 parts of EPIKOTE-828 and 20 parts of phenyl glycidyl ether bromide made by Nippon Kayaku Co., Ltd. | W | 0.01534 |

Note:
W was the shape of the refractive index distribution equivalent to the shape shown in FIG. 2 whereas M was the shape of the refractive index distribution reverse to the shape shown in FIG. 2.

Figure 3A:
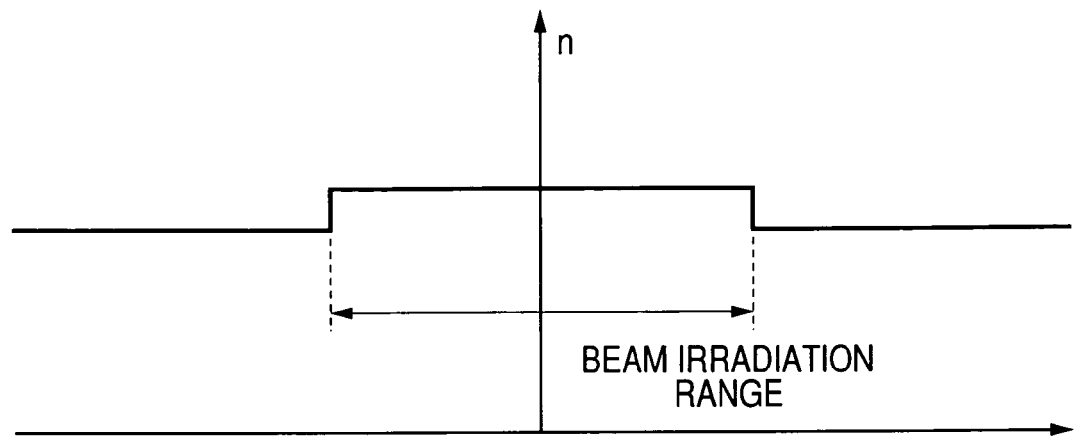
FIGS. 3A to 3C are graphs schematically showing refractive index distributions in a verifying experiment, FIG. 3A showing a refractive index distribution just after the stop of light irradiation, FIG. 3B showing a refractive index distribution in each of mixture solutions A, B and D after the passage of a predetermined time, FIG. 3C showing a refractive index distribution in a mixture solution C after the passage of a predetermined time.
Figure 3B:
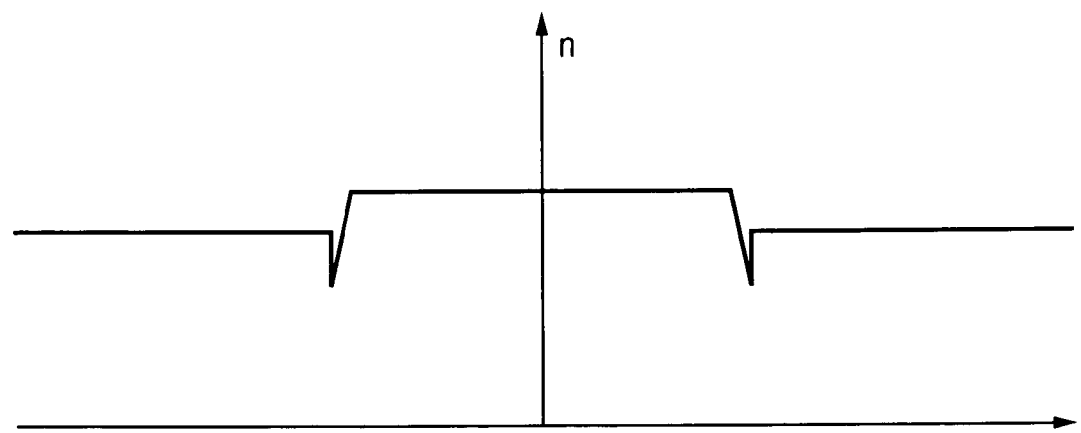
Figure 3C:
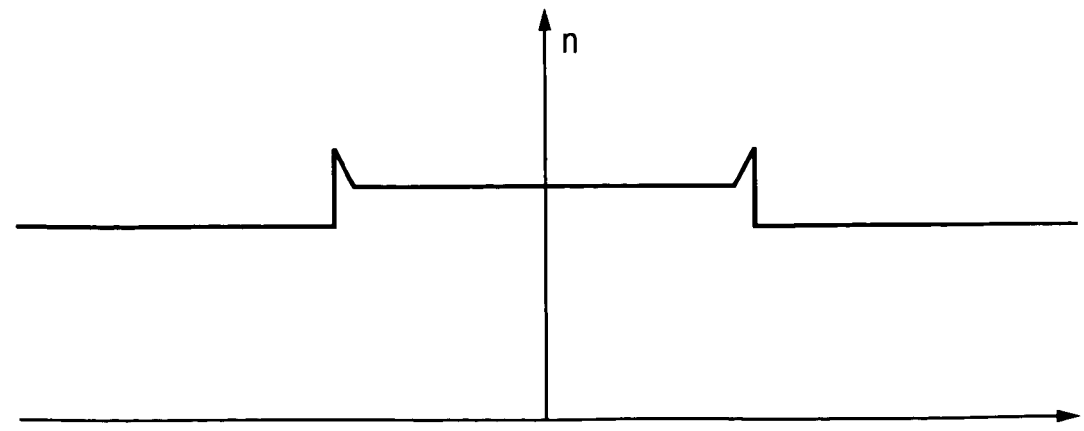

Each mixture solution was held in the form of a disk with a thickness of 150 μm and an area of 1 cm² while sandwiched between two glass plates. Then, a laser beam with a wavelength of 458 nm and irradiation power of 3 mW was applied onto the center portion of the disk through a quartz fiber (core diameter: 600 μm, numerical aperture: 0.37) for 15 seconds. Change in refractive index distribution of the portion irradiated with the light beam and its peripheral portion with the elapsed time on this occasion was observed with a two-beam interference microscope FIGS. 3A to 3C are conceptual views showing results of the microscopic observation. In the portion irradiated with the light beam, the radical polymerizable monomer was cured but the cationic polymerizable monomer was enveloped in the portion irradiated with the light beam (i.e. in the partially uncured core) while the cationic polymerizable monomer was not cured. When irradiation with the light beam was stopped, the refractive index distribution just after the stop of irradiation was a step refractive index distribution. What is meant by this is the fact that the mixture ratio of the radical polymerizable monomer to the cationic polymerizable monomer in the mixture solution in the outside of the core not irradiated with the light beam is kept at an initial mixture ratio while the mixture ratio of the cured of the radical polymerizable monomer to the cationic polymerizable monomer in the inside of the core irradiated with the light beam is kept at an initial mixture ratio just after irradiation with the light beam was stopped. Incidentally, it is very general that the refractive index of the cured resin (solid) becomes higher than the refractive index of the resin (liquid) before curing. Accordingly, even in the case where part of the mixture solution is cured, the refractive index of the partially cured mixture (solid-liquid mixture) becomes higher than the refractive index of the mixture (liquid) before curing. This fact is shown in FIG. 3A.

Change in refractive index in the neighbor of the outer circumference of the portion irradiated with the light beam with the passage of time for leaving the mixture solution at rest was then confirmed. That is, when the mixture solution A, B or D given W in the "Note" column in Table 2 was used, the shape of the refractive index distribution changed from the step shape shown in FIG. 3A to the shape shown in FIG. 3B. It is conceived that this phenomenon occurs also in Example 1. On the other hand, when the mixture solution C given M in the "Note" column in Table 2 was used, the shape of the refractive index distribution changed from the step shape shown in FIG. 3A to the shape shown in FIG. 3C.

Incidentally, in the first embodiment, if the predetermined time for leaving the vessel at rest in the diffusing step of diffusing the uncured first photo-curable resin solution into the surface layer of the light-transmissive optical path portion is short, a precipitous low-refractive-index portion is formed. If the predetermined time for leaving the vessel at rest is long, a refractive index distribution is formed so that the refractive index increases slowly as the location changes from the surface layer of the light-transmissive optical path portion to the center of the optical path portion.

Specific embodiments of the invention will be described below. Incidentally, the invention is not limited to the following embodiments.

Second Embodiment

Each of core materials shown in Table 3 was used as a first curable resin solution capable of being cured by a light beam. A mixture containing 108 parts by weight of photo-curable OXT-221 made by Toagosei Co., Ltd. and 2 parts by weight of photo-curable UVR-6110 made by Union Carbide Corp. was used as a second curable resin solution. An optical waveguide was produced as follows. In Table 3, solubility parameter is simply abbreviated to "SP". The term "SP" is hereinafter used as an abbreviation of "solubility parameter". The viscosity of the second curable resin solution was 120 mPa·s. The SP of the second curable resin solution calculated on the basis of the SP 18.25 $MPa^{1/2}$ of OXT-221 made by Toagosei Co., Ltd. and the SP 23.44 $MPa^{1/2}$ of UVR-6110 made by Union Carbide Corp. was 19.28 $MPa^{1/2}$. On this occasion, the solubility parameter was calculated in accordance with the Small's calculation method described in "Polymer Handbook $4^{th}$ edition", pp.682–685, John Wiley & Sons Inc., and data (pp. 682–685 and table 1–3) prepared for the method. Incidentally, a monomer of OXT-221 is di(1-ethyl(3-oxetanyl))methyl ether whereas a monomer of UVR-6110 is 3,4-epoxycyclohexylmethyl 3,4-epoxycyclohexanecarboxylate. OXT-221 contains a photopolymerization initiator

TABLE 3

| Maker | Type | Structural Formula | Viscosity (mPa.s) (before curing) | SP($MPa^{1/2}$) | Refractive Index (after curing) | Transmission Loss (dB/cm) |
|---|---|---|---|---|---|---|
| Kyoeisha Chemical Co., Ltd. | Light Acrylate BP-4PA | (A) | 1950 | 20.17 | 1.54 | 2.3 |
| Kyoeisha Chemical Co., Ltd. | Epoxy Ester 40EM | (B) | 800 | 24.7 | 1.522 | 1.2 |
| Kyoeisha Chemical Co., Ltd. | Light Acrylate DCP-A | (C) | 150 | 17.04 | 1.531 | 0.77 |

TABLE 3-continued

| Maker | Type | Structural Formula | Viscosity (mPa.s) (before curing) | SP(MPa$^{1/2}$) | Refractive Index (after curing) | Transmission Loss (dB/cm) |
|---|---|---|---|---|---|---|
| Kyoeisha Chemical Co., Ltd. | Epoxy Ester 70PA | (D) | 1000 | 24.81 | 1.509 | 1.35 |
| Kyoeisha Chemical Co., Ltd. | Light Ester G-201P | (E) | 60 | 22.2 | 1.502 | 0.40 |
| Kyoeisha Chemical Co., Ltd. | Light Acrylate PE-3A | (F) | 600 | 23.59 | 1.511 | 0.25 |
| Nippon Kayaku Co., Ltd. | KAYARD R-167 | (G) | 900 | 23.95 | 1.507 | 1.40 |
| Nippon Kayaku Co., Ltd. | KAYARD R-1402(T) | (H) | 1000 | 19.96 | 1.509 | 0.38 |
| Nippon Kayaku Co., Ltd. | KAYARD R-712 | (I) | 900 | 20.74 | 1.566 | 0.95 |
| Nippon Kayaku Co., Ltd. | KAYARD R-684 | (J) | 175 | 17.04 | 1.531 | 0.97 |
| Nippon Kayaku Co., Ltd. | KAYARD PM-21 | (K) | 1150 | 24.34 | 1.499 | 3.14 |

(A)

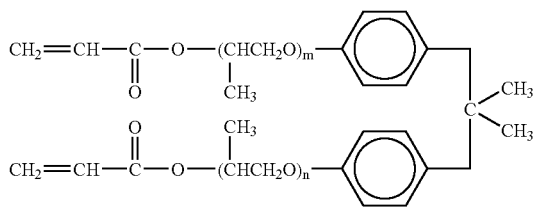

(B)

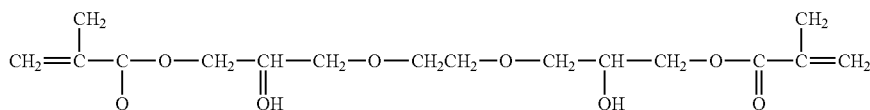

(C)

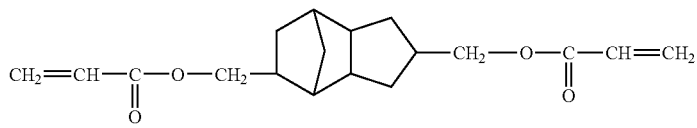

(D)

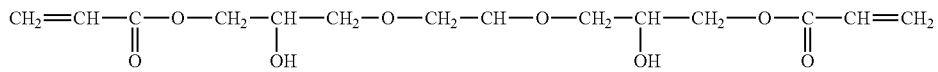

(E)

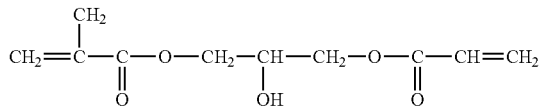

(F)

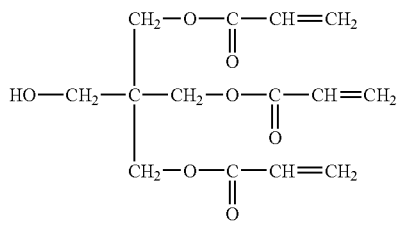

(G)

TABLE 3-continued

| Maker | Type | Structural Formula | Viscosity (mPa.s) (before curing) | SP(MPa$^{1/2}$) | Refractive Index (after curing) | Transmission Loss (dB/cm) |
|---|---|---|---|---|---|---|

(H)
$$CH_2=CH-\underset{O}{\underset{\|}{C}}-O-CH_2-\underset{OH}{\underset{|}{CH}}-CH_2-O-CH_2-CH_2-CH_2-CH_2-CH_2-CH_2-O-CH_2-\underset{OH}{\underset{|}{CH}}-CH_2-O-\underset{O}{\underset{\|}{C}}-CH=CH_2$$

(I)
$$CH_3-CH_2-\underset{\underset{CH_2-O-\underset{O}{\underset{\|}{C}}-CH=CH_2}{\overset{CH_2-O-\underset{O}{\underset{\|}{C}}-CH=CH_2}{|}}}{C}-(CH_2-O-CH_2)-\underset{\underset{CH_2-O-\underset{O}{\underset{\|}{C}}-CH=CH_2}{\overset{CH_2-O-\underset{O}{\underset{\|}{C}}-CH=CH_2}{|}}}{C}-CH_2CH_3$$

(J)
$$CH_2=CH-\underset{O}{\underset{\|}{C}}-(O-CH_2-CH_2)_n-O-\bigcirc-\underset{\underset{H}{|}}{\overset{\overset{H}{|}}{C}}-\bigcirc-O-(CH_2-CH_2-O)_m-\underset{O}{\underset{\|}{C}}-CH=CH_2$$

(K)
$$CH_2=CH-\underset{O}{\underset{\|}{C}}-O-CH_2-\text{[tricyclic structure]}-CH_2-O-\underset{O}{\underset{\|}{C}}-CH=CH_2$$

$$\left[CH_2=\underset{\underset{O}{\underset{\|}{C}}-O-CH_2-CH_2-(O-\underset{O}{\underset{\|}{C}}-CH_2-CH_2-CH_2-CH_2)_m-O}{\overset{CH_3}{|}}\right]_n -\underset{O}{\underset{\|}{P}}-(OH)_2$$

Figure 4A:
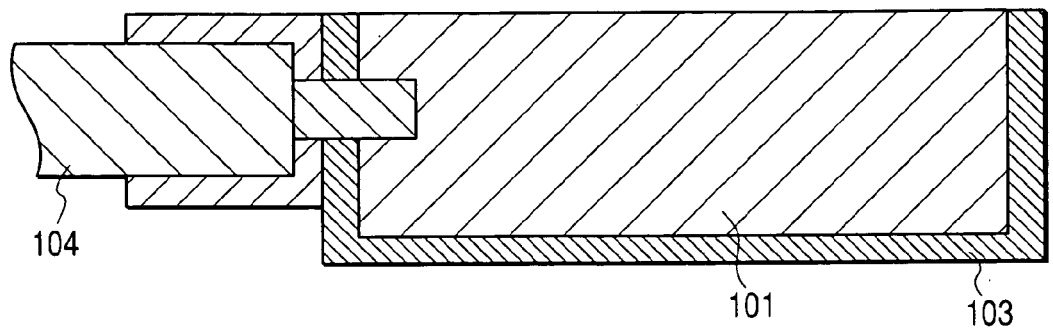
FIGS. 4A to 4D are process views (sectional views) showing a process for producing an optical waveguide according to the invention.
Figure 4B:
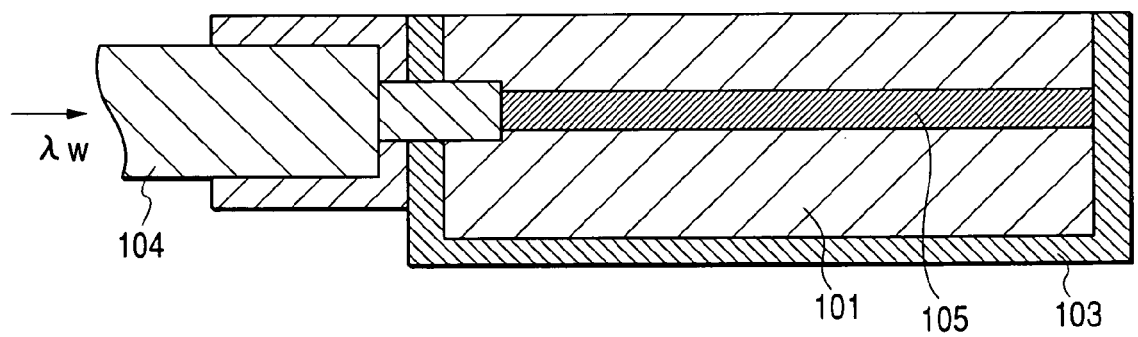

FIGS. 4A to 4D are process views (sectional views) showing a process for producing an optical waveguide 110 according to the invention. First, as shown in FIG. 4A, in the condition that an acrylic transparent vessel 103 shaped like a rectangular parallelepiped opened at the top was filled with the first curable resin solution 101, a plastic optical fiber 104 was immersed in the first curable resin solution 101. A material having a core diameter of 980 μm and a numerical aperture of 0.25 was used as the plastic optical fiber 104. Then, a laser beam with a wavelength of 488 nm transmitted through the plastic optical fiber 104 was applied on the first curable resin solution 101. The intensity of the laser beam output from the plastic optical fiber 104 was set at 100 mW. The wavelength of 488 nm was selected as a wavelength for activating the photopolymerization initiator contained in each first curable resin solution 101. In this manner, the first curable resin solution 101 was cured gradually by the laser beam applied on the first curable resin solution 101 so that an axial core 105 was formed by self-focusing. In this embodiment, the core 105 reached the wall of the transparent vessel 103 (FIG. 4B) when the core 105 having a length of 15 mm was formed.

Figure 4C:
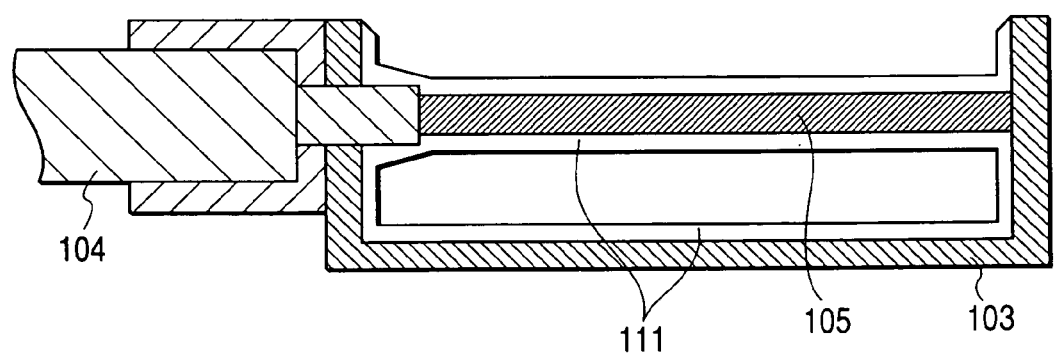
Figure 4D:
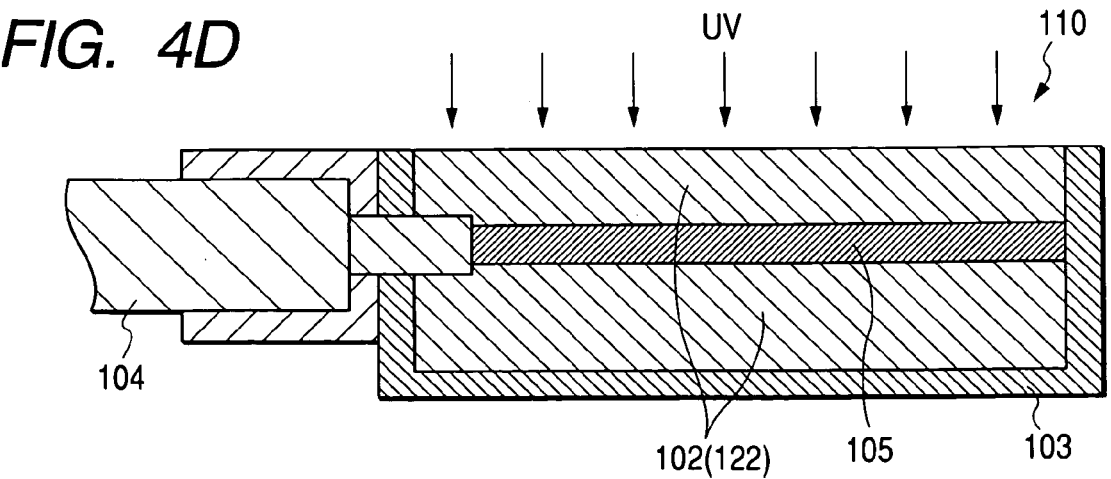

Then, uncured part of the first curable resin solution 101 was removed through the opening of the transparent vessel 103. On this occasion, cleaning with a solvent or the like was not performed. For this reason, large part of the first curable resin solution 101 could be removed but remaining uncured part 111 of the first curable resin solution was deposited on the surface of the core 105 and the inner surface of the transparent vessel 103 as shown in FIG. 4C. Then, the transparent vessel 103 was filled with the second curable resin solution 102. On this occasion, the uncured part 111 of the first curable resin solution was diffused into the second curable resin solution 102. Then, ultraviolet rays were applied on the second curable resin solution 102 to cure the second curable resin solution 102 to thereby form a clad. On this occasion, the uncured part 111 of the first curable resin solution diffused into the second curable resin solution 102 was photopolymerized together with the second curable resin solution 102 to form a cured resin 122 (FIG. 4D).

Figure 5:
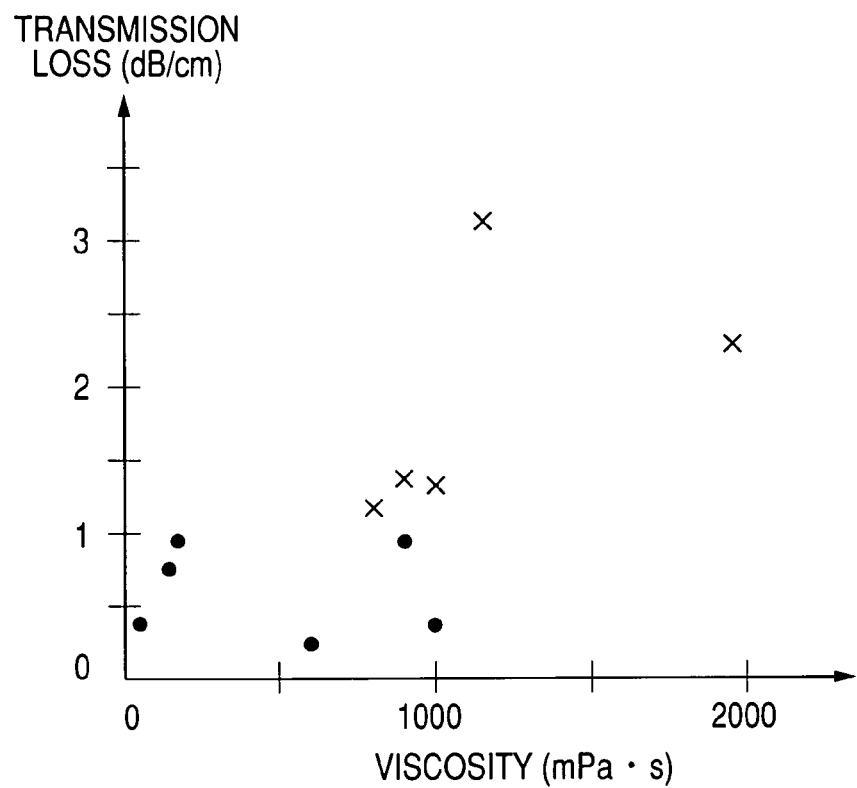
FIG. 5 is a graph showing the relation between the viscosity of a first curable resin solution and the transmission loss of the optical waveguide.
Figure 6:
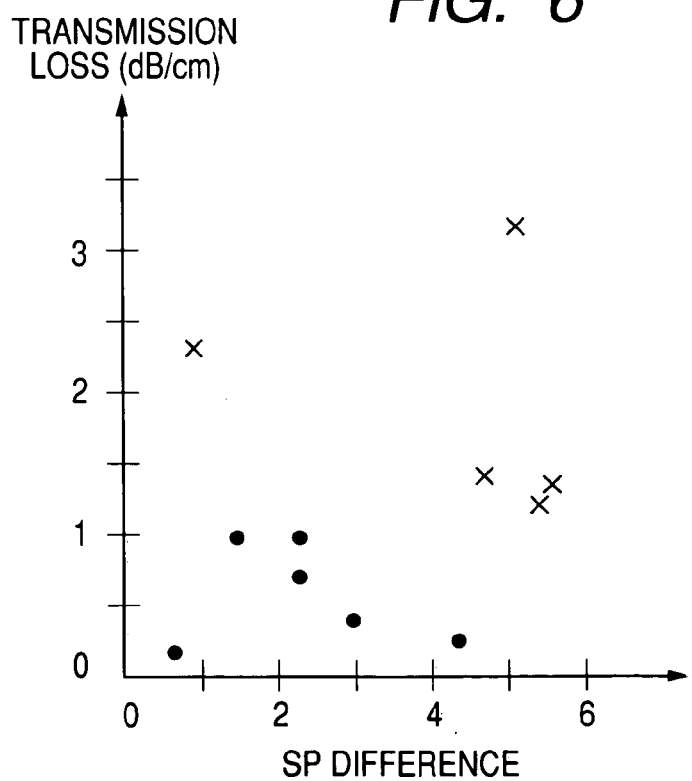
FIG. 6 is a graph showing the relation between the SP difference between first and second curable resin solutions and the transmission loss of the optical waveguide.
Figure 7:
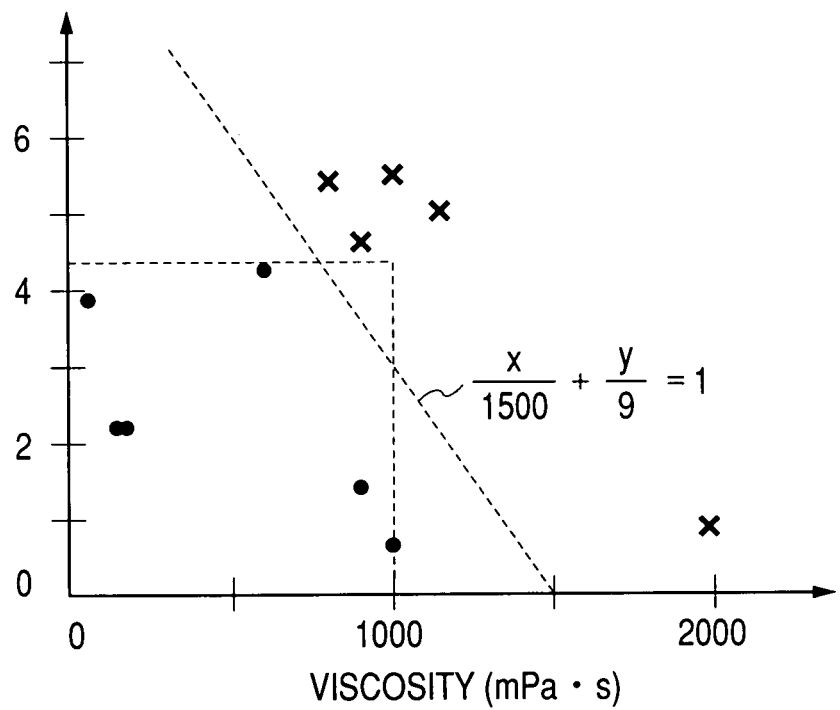
FIG. 7 is a graph showing the relation between the viscosity of the first curable resin solution and the SP difference between the first and second curable resin solutions.

The transmission loss of the optical waveguide 110 formed in this manner was measured to examine the relation between the transmission loss and the viscosity of the first curable resin solution 101 and the relation between the transmission loss and the SP difference between the first and second curable resin solutions. FIG. 5 is a graph showing the relation between the viscosity of the first curable resin solution 101 and the transmission loss of the optical waveguide 110. FIG. 6 is a graph showing the relation between the SP difference between the first and second curable resin solutions and the transmission loss of the optical waveguide 110. FIG. 7 is a graph showing the relation between the viscosity of the first curable resin solution 101 and the SP difference between the first and second curable resin solutions. In FIGS. 5 to 7, black dot marks show the good case where the transmission loss is not higher than 1 dB/cm, and cross marks (X) show the case where the transmission loss is higher than 1 dB/cm. It is impossible to obtain any clear yardstick from FIGS. 5 and 6. That is, the range in which the transmission loss of the optical waveguide 110 is low cannot be specified from only the viscosity of the first curable resin solution 101 or only the SP difference between the first and second curable resin solutions. It has been however found that the transmission loss of the optical waveguide 110 can be set to be not higher than 1 dB/cm when the viscosity of the first curable resin solution 101 and the SP difference between the first and second curable resin solutions are combined with each other as shown in FIG. 7 so that the viscosity of the first curable resin solution 101 is not higher than 1500 mPa·s while the SP difference between the first and second curable resin solutions is not larger than 4.4 MPa$^{1/2}$. That is, when the first and second curable resin solutions are low in viscosity and good in mutual solubility, the uncured part 111 of the first curable resin solution deposited on the core 105, etc. can be easily diffused into the second curable resin solution 102. Conversely, when either of the first and second curable resin solutions is high in viscosity or when the first and second curable resin solutions are poor in mutual solubility, the uncured part 111 of the first curable resin solution deposited on the core 105, etc. cannot be easily diffused into the second curable resin solution 102, that is, the scattering loss of the surface of the core 105, etc. becomes high because the uncured part 111 of the first curable resin solution is cured while deposited on the core 105, etc. Incidentally, it is obvious from FIG. 7 that the viscosity is further preferably selected to be not higher than 1000 mPa·s. It is also obvious that the viscosity x mpa·s and the SP difference y MPa$^{1/2}$ maybe preferably adjusted in the range $x/1500+y/9 \leq 1$ in which $\underline{x}$ is the viscosity (mPa·s), and $\underline{y}$ is the SP difference (MPa$^{1/2}$).

Incidentally, a comparative experiment corresponding to each of the aforementioned experiment was performed as follows. After the core 105 with a length of 15 mm was formed, uncured part of the first curable resin solution 101 was removed by ultrasonic cleaning using isopropyl alcohol. Then, the transparent vessel 103 was filled with the second curable resin solution 102. The second curable resin solution 102 was cured to form an optical waveguide. The transmission loss of the optical waveguide was measured. On this occasion, the transmission loss exhibited a low value in a range of from 0.2 to 0.5 dB/cm even in the case where any material was used as the first curable resin solution 101. For this reason, it is conceived that the high transmission loss as shown in Table 3 and FIGS. 5 to 7 is caused by the uncured part 111 of the first curable resin solution deposited on the core 105 and the cured thereof.

Third Embodiment

Figure 8:
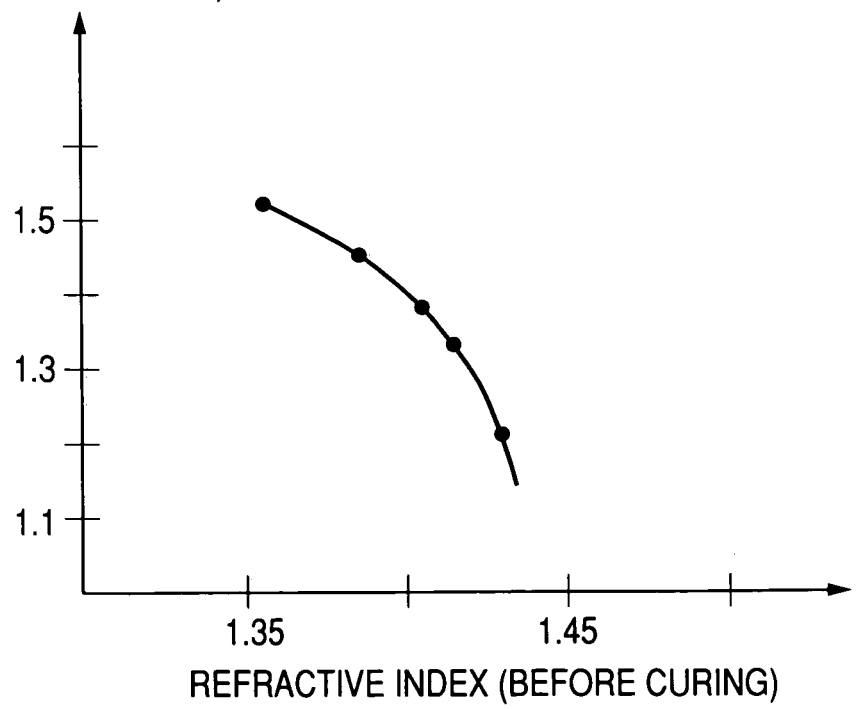
FIG. 8 is a graph showing the relation between refractive index and specific gravity in each monomer according to the third embodiment.
Figure 9:
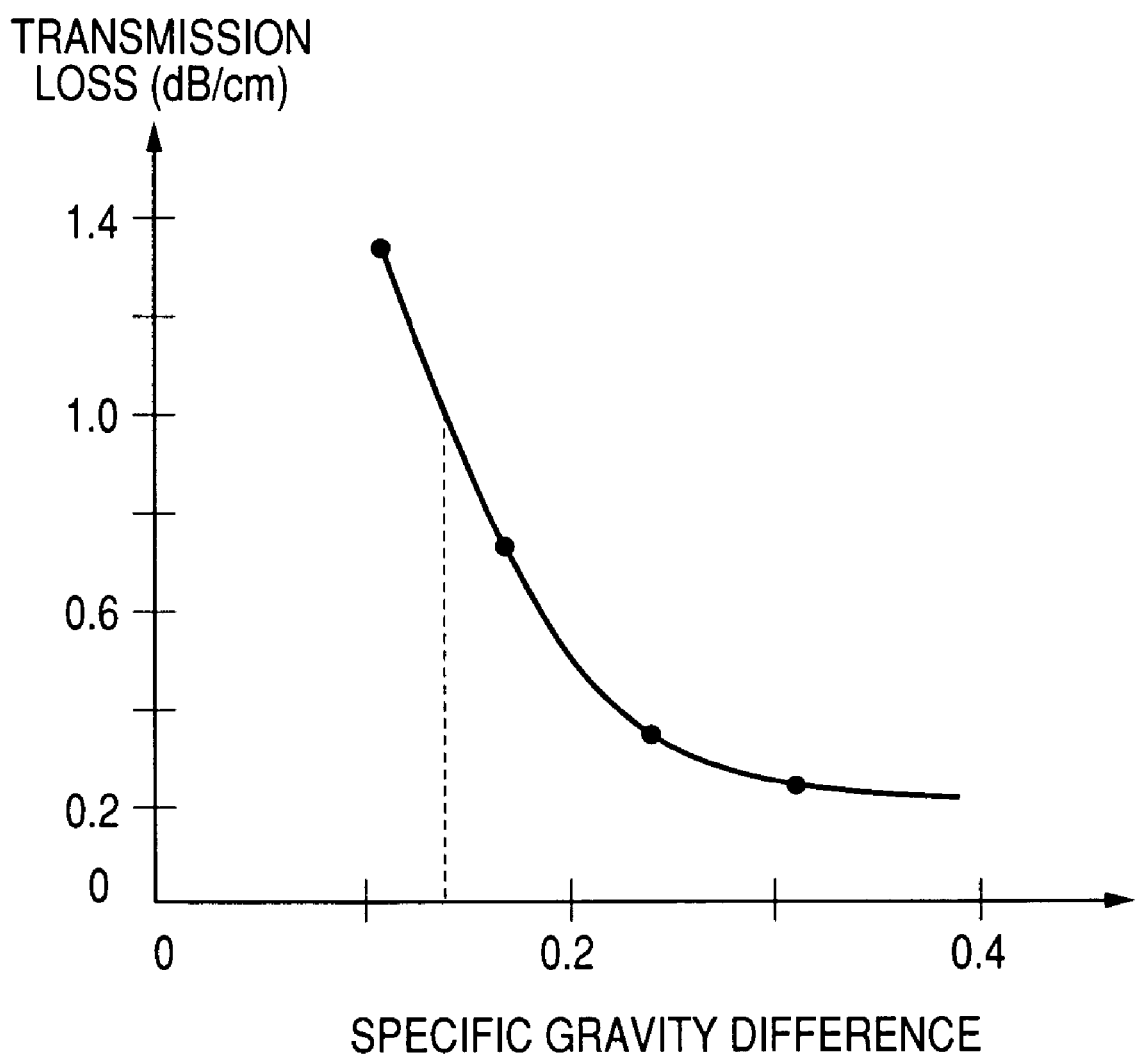
FIG. 9 is a graph showing the relation between the specific gravity difference between the first and second curable resin solutions and the transmission loss of the optical waveguide.

An optical waveguide 110 was formed in the same manner as in the second embodiment except that a first curable resin solution 101 for forming a core as shown in Table 4 and a second curable resin solution 102 for forming a clad as shown in Table 4 were used. The transmission loss of the optical waveguide 110 was measured. Table 4 and FIGS. 8 and 9 show results of the measurement. FIG. 8 shows the relation between refractive index and specific gravity in five combinations of the first curable resin solution 101 and the second curable resin solution 102 before curing. In this embodiment, defencers OP-38, OP-40, OP-43, OP-44 and OP-47 made by Dainippon Ink and Chemicals, Inc. were used as fluorinated acrylic monomers. These are fluorine-substituted acrylic monomers. The defencer OP-38 is the largest in the amount of substituted fluorine. The defencers OP-40, OP-43, OP-44 and OP-47 are in descending order of the amount of substituted fluorine. For this reason, as the amount of substituted fluorine increases, the refractive index decreases and the specific gravity increases. FIG. 8 shows this relation.

TABLE 4

| Region | Type | Specific Gravity (before curing) | Viscosity (mPa.s) (before curing) | Refractive Index (after curing) | NA | Transmission Loss (dB/cm) |
|---|---|---|---|---|---|---|
| Core | Defencer OP-47 | 1.21 | 2000 | 1.47 | — | — |
| Clad | Defencer OP-44 | 1.32 | 2000 | 1.44 | 0.295 | 1.34 |
| | Defencer OP-43 | 1.38 | 2000 | 1.43 | 0.341 | 0.74 |
| | Defencer OP-40 | 1.45 | 2000 | 1.40 | 0.448 | 0.35 |
| | Defencer OP-38 | 1.52 | 2000 | 1.38 | 0.506 | 0.25 |

FIG. 9 shows the relation between transmission loss and specific gravity difference between the first and second curable resin solutions 101 and 102 when an optical waveguide is formed by using defencer OP-47 as the first curable resin solution 101 and each of defencers OP-38, OP-40, OP-43 and OP-44 as the second curable resin solution 102. When the specific gravity difference was larger than 0.14, a good result was obtained so that the transmission loss became lower than 1 dB/cm. On this occasion, it is conceived that the remaining uncured part 111 of the first curable resin solution cannot be diffused into the second curable resin solution 102 because the first and second curable resin solutions 101 and 102 are high in viscosity. When the specific gravity difference is not smaller than 0.2, the transmission loss shows a tendency to reduction to a value not higher than 0.5 dB/cm. When the specific gravity difference is not smaller than 0.24, the transmission loss shows a tendency to reduction to a value not higher than 0.35 dB/cm. When the specific gravity difference is not smaller than 0.3, the transmission loss shows a tendency to reduction to a value not higher than 0.25 dB/cm. Accordingly, the specific gravity difference is further preferably selected to be not larger than 0.2 and specifically further preferably selected to be not larger than 0.24.

Although each of the second and third embodiments has been described on the case where a photo-curable resin solution is used as the second curable resin solution, the invention maybe also applied to the case where, for example, a heat-curable resin solution is used as the second curable resin solution.

Configuration may be made so that the core portion is formed by light beam irradiation but the clad portion is formed by another method than light beam irradiation.

The time requiring for curing the second curable resin solution after filling the vessel with the second curable resin may be preferably set at about 10 minutes or shorter. When the time is set at 10 minutes or shorter, uncured part of the second curable resin solution can be prevented from penetrating the core (cured part of the first curable resin solution) and accordingly making the core swollen.

Figure 10A:
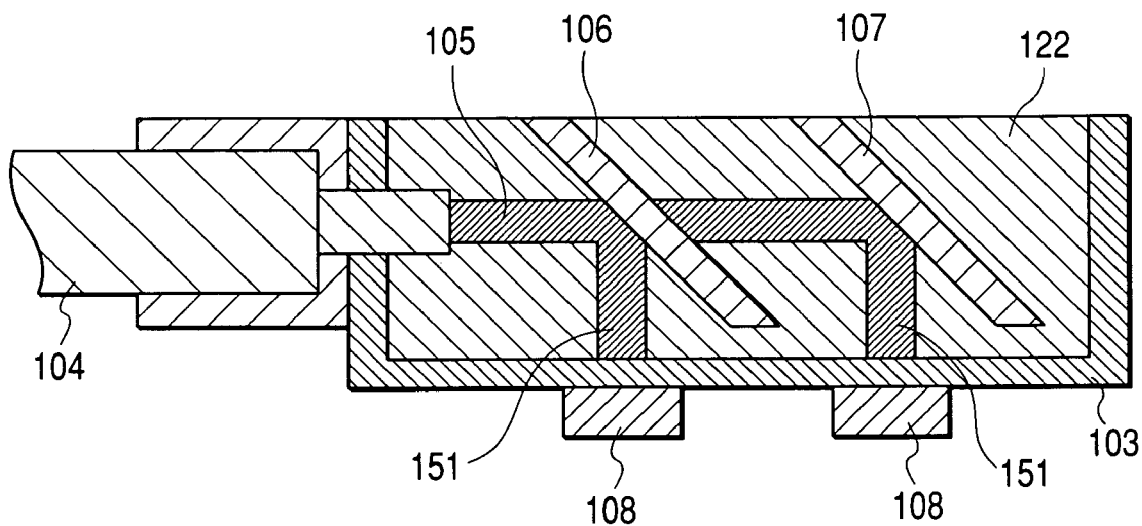
FIG. 10A is a sectional view of an optical module.
Figure 10B:
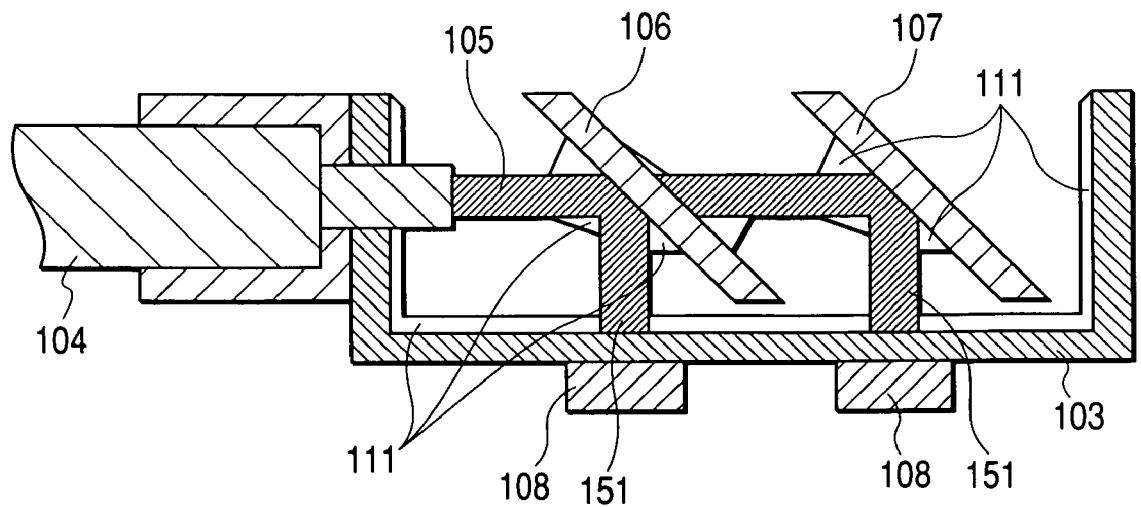
FIG. 10B is a sectional view showing the middle of a production process in the case where cleaning is insufficient.

Incidentally, in the third embodiment, when each terminal end 151 of the core 105 is mainly connected to a light-receiving or light-emitting element 108 on the lower surface of the transparent vessel 103 as shown in FIG. 10B, a material high in specific gravity maybe preferably used as the second curable resin solution so that uncured part of the first curable resin solution 101 can be removed upward easily from the neighbor of each terminal end 151 of the core 105 connected to the light-receiving or light-emitting element 108 on the lower surface of the transparent vessel 103.

It is preferable that the refractive index of the second curable resin solution after curing is lower than the refractive index of uncured part of the first curable resin solution. The axial core formed by self-focusing confines transmission light in itself on the basis of the refractive index difference between the core and uncured part of the first curable resin solution. Accordingly, it is preferable that the refractive index of the second curable resin solution after curing is lower than the refractive index of uncured part of the first curable resin solution in order to avoid radiation loss caused by reduction of the refractive index difference.

What is claimed is:

1. A method of producing an optical waveguide including a core including at least one column-shaped part, and a clad which has a refractive index lower than that of the core and with which the circumference of the core is covered, the method comprising:
    putting a first curable resin solution capable of being cured by a light beam with a certain wavelength in a desired vessel;
    irradiating the first curable resin solution with the light beam to cure a part of the first curable resin solution to thereby form the core including the at least one column-shaped part;
    taking a portion of an uncured part of the first curable resin solution out of the vessel after the formation of the core having a desired shape;
    filling the vessel containing the core formed as the cured part of the first curable resin solution with a second curable resin solution different in at least composition from the first curable resin solution and having mutual solubility for the first curable resin solution so that another portion of the uncured part of the first curable resin solution remaining in the vessel is dissolved in the second curable resin solution; and
    curing the another portion of the uncured part of the first curable resin solution and the second curable resin solution, wherein:
    each of the first and second curable resin solutions has a coefficient of viscosity not higher than 1500 mPa·s; and
    the difference between a solubility parameter of the first curable resin solution and a solubility parameter of the second curable resin solution is not larger than 4.4 MPa$^{1/2}$.

2. The method of producing an optical waveguide according to claim 1, wherein:
    at least one of a total reflection mirror, a half mirror and a dichroic mirror is disposed in the vessel; and
    a branched or bent portion of the core is formed while a junction between the core and one of the total reflection mirror, the half mirror and the dichroic mirror is formed in the step for forming the column-shaped core.

3. The method of producing an optical wave guide according to claim 1, wherein the second curable resin solution comprises a photo-curable resin.

4. A method of producing an optical waveguide including a core including at least one column-shaped part, and a clad which has a refractive index lower than that of the core and with which the circumference of the core is covered, the method comprising:
    putting a first curable resin solution capable of being cured by a light beam with a certain wavelength in a desired vessel;
    irradiating the first curable resin solution with the light beam to cure a part of the first curable resin solution to thereby form the core having the at least one column-shaped part;
    taking the core out of the vessel and incorporating the core in another vessel after the formation of the core having a desired shape;
    filling the vessel containing the core with a second curable resin solution different in at least composition from the first curable resin solution and having mutual solubility for the first curable resin solution so that an uncured part of the first curable resin solution remaining on a surface of the core is dissolved in the second curable resin solution; and
    curing the uncured part of the first curable resin solution and the second curable resin solution, wherein:
    each of the first and second curable resin solutions has a coefficient of viscosity not higher than 1500 mPa·s; and
    the difference between solubility parameter of the first curable resin solution and solubility parameter of the second curable resin solution is not larger than 4.4 MPa$^{1/2}$.

5. The method of producing an optical waveguide according to claim 4, wherein:
    at least one of a total reflection mirror, a half mirror and a dichroic mirror is disposed in the vessel used for forming the core;
    a branched or bent portion of the core is formed while a junction between the core and one of the total reflection mirror, the half mirror and the dichroic mirror is formed in the step for forming the column-shaped core; and
    in the condition that the branched or bent portion of the core is integrated with one of the total reflection mirror, the half mirror and the dichroic mirror, the core is taken out of the vessel and incorporated in another vessel in the step of taking the core out of the vessel and incorporating the core in the other vessel.

6. The method of producing an optical waveguide according to claim 4, wherein the second curable resin solution comprises a photo-curable resin.

7. The method of producing an optical waveguide according to claim 1, wherein each of the first and second curable resin solutions has a coefficient of viscosity not higher than 1000 mPa·s.

8. The method of producing an optical waveguide according to claim 4, wherein each of the first and second curable resin solutions has a coefficient of viscosity not higher than 1000 mPa·s.

9. The method of producing an optical waveguide according to claim 1, wherein the coefficient of viscosity of each of the first and second curable resin solutions and the difference between the solubility parameter of the first curable resin solution and the solubility parameter of the second curable resin solution satisfy:

$$X/1500 + Y/9 \leq 1$$

wherein X comprises the coefficient of viscosity (mPa·s), and Y comprises the difference (MPa$^{1/2}$) between the solubility parameter of the first curable resin solution and the solubility parameter of the second curable resin solution.

10. The method of producing an optical waveguide according to claim 4, wherein the coefficient of viscosity of each of the first and second curable resin solutions and the difference between the solubility parameter of the first curable resin solution and the solubility parameter of the second curable resin solution satisfy:

$$X/1500+Y/9 \leq 1$$

wherein X comprises the coefficient of viscosity (mPa·s), and Y comprises the difference (MPa½) between the solubility parameter of the first curable resin solution and the solubility parameter of the second curable resin solution.

11. The method of producing an optical waveguide according to claim 1, wherein a transmission loss of said optical waveguide is one of equal to and less than 1 dB/cm.

12. The method of producing an optical waveguide according to claim 4, wherein a transmission loss of said optical waveguide is one of equal to and less than 1 dB/cm.

13. The method of producing an optical waveguide according to claim 1, wherein the coefficient of viscosity is measured at a temperature when the vessel is filled with the second curable resin solution.

14. The method of producing an optical waveguide according to claim 4, wherein the coefficient of viscosity is measured at a temperature when the vessel is filled with the second curable resin solution.

* * * * *